United States Patent [19]
Lussier

[11] Patent Number: 5,860,326
[45] Date of Patent: Jan. 19, 1999

[54] COMBINED SPEED SHIFTER AND BRAKE HANDLE ASSEMBLY

[75] Inventor: Clément Lussier, Marieville, Canada

[73] Assignee: Corporacion Resentel S.A. De C.V., Saltillo, Mexico

[21] Appl. No.: 824,325

[22] Filed: Mar. 26, 1997

[51] Int. Cl.$^6$ .................................................. G05G 11/00
[52] U.S. Cl. ..................... 74/489; 74/502.2; 74/473.13
[58] Field of Search .................................. 74/489, 502.2, 74/473.13

[56] References Cited

U.S. PATENT DOCUMENTS

| | | |
|---|---|---|
| 5,102,372 | 4/1992 | Patterson et al. . |
| 5,134,897 | 8/1992 | Romano ................................ 74/489 |
| 5,315,891 | 5/1994 | Tagawa ................................ 74/489 |
| 5,577,413 | 11/1996 | Tagawa et al. ....................... 74/489 |
| 5,615,580 | 4/1997 | Chen et al. ........................... 74/489 |

*Primary Examiner*—Charles A. Marmor
*Assistant Examiner*—David Fenstermacher
*Attorney, Agent, or Firm*—ROBIC

[57] ABSTRACT

The combined speed shifter and brake handle assembly is for a multispeed bicycle. The assembly comprises a handlebar bracket to secure the assembly on a bicycle handlebar, a rotative speed shifter mechanism for pulling and releasing a speed control cable, and a brake bracket projecting from the handlebar bracket, to pivotally receive an end of a brake lever at a predetermined distance from the bicycle handlebar. The speed shifter mechanism has a shifter lever with an annular member rotatably mounted on a rim member fixed to the handlebar bracket, for rotation about the bicycle handlebar, and held in place thereon by a cap member. Friction elements provide a predetermined frictional contact that opposes against rotation of the annular member relative to the cap member and the rim. The speed control cable is guided toward the speed shifter lever, to which it is fastened.

18 Claims, 6 Drawing Sheets

COMBINED SPEED SHIFTER AND BRAKE HANDLE ASSEMBLY

FIELD OF THE INVENTION

The invention relates in general to bicycle brake and speed shifter arrangements and more particularly to a combined speed shifter and brake handle assembly for a multispeed bicycle.

BACKGROUND OF THE INVENTION

The bicycle industry is constantly searching for new ways to reduce the costs of manufacturing bicycles in order to remain competitive with respect to other products, especially since the arrival of roller blades on the market.

Known in the art is U.S. Pat. No. 5,102,372 (PATTERSON et al.) which describes a bicycle gear shifting system having a rotative speed shifter integrated in the grip of the handlebar so that the cyclist does not have to remove his hands from the grip to change the speeds. The rotative speed shifter has a lobed cam mechanism that pulls or releases the speed control cable, thereby causing speed shifts. Although the grip is a part of the speed shifter, the manufacturing costs thereof remain high in view of the complexity of the mechanism.

SUMMARY OF THE INVENTION

Therefore, one object of the present invention is to provide a combined speed shifter and brake handle assembly for a multispeed bicycle, which is relatively simple in design and inexpensive to manufacture, but yet which provides all the required functionality and reliability.

Another object of the invention is to provide a combined speed shifter and brake handle assembly which is adapted for molding process manufacture.

According to the present invention, there is provided a combined speed shifter and brake handle assembly for a multispeed bicycle, comprising:

a handlebar bracket to secure the assembly on a bicycle handlebar;

shifter means for pulling and releasing a speed control cable, the shifter means including:

a shifter lever having an end provided with an annular member sized to receive the bicycle handlebar and a cable fastening means for retaining an end of the speed control cable;

mounting means fixed to the handlebar bracket for rotatably mounting the annular member of the shifter lever for rotation about the bicycle handlebar, said mounting means including cable guide means for slidably guiding the speed control cable around the bicycle handlebar beside the shifter lever; and friction means cooperatively mounted on the annular member of the shifter lever and the mounting means, respectively, for providing a predetermined frictional contact that opposes against rotation of the annular member relative to the mounting means; and a brake bracket projecting from the handlebar bracket, to pivotally receive an end of a brake lever at a predetermined distance from the bicycle handlebar.

Preferably, the handlebar bracket, the shifter means and the brake bracket are all in plastic material, and are molded in a single integral piece except for the mobile components like the shifter lever or the cap member that holds the shifter lever in place.

BRIEF DESCRIPTION OF THE DRAWINGS

A detailed description of preferred embodiments of the invention will be given hereinbelow with reference to the following drawings, in which like numbers refer to like elements.

DETAILED DESCRIPTION OF PREFERRED EMBODIMENTS

Figure 1:
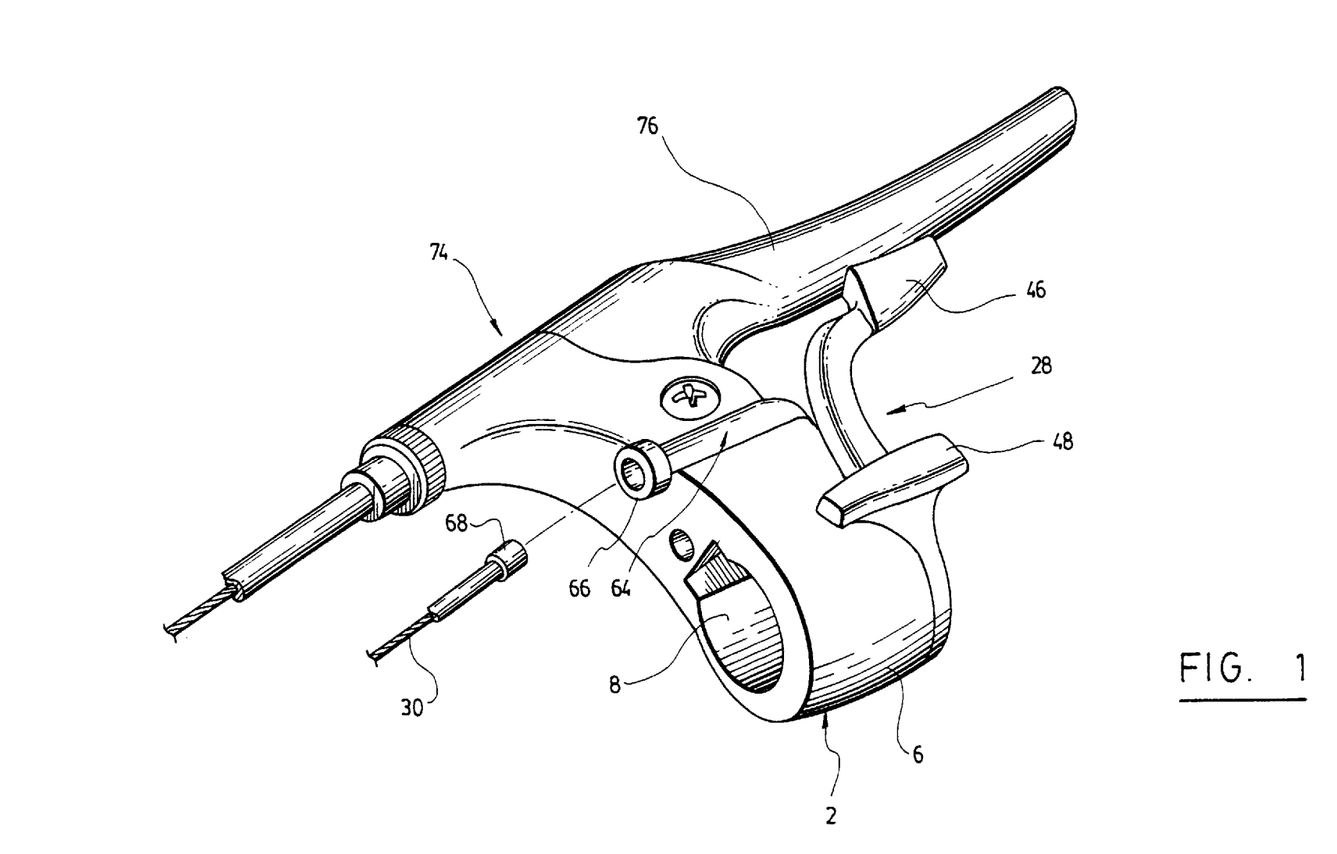
FIG. 1 is a perspective view of a combined speed shifter and brake handle assembly according to the invention, provided with a brake lever.

Referring to FIG. 1, there is shown a perspective view of a combined speed shifter and brake handle assembly for a multispeed bicycle, according to the invention. The assembly comprises a handlebar bracket 2, a speed shifter mechanism 28, and a brake bracket 74 combined together.

Figure 3:
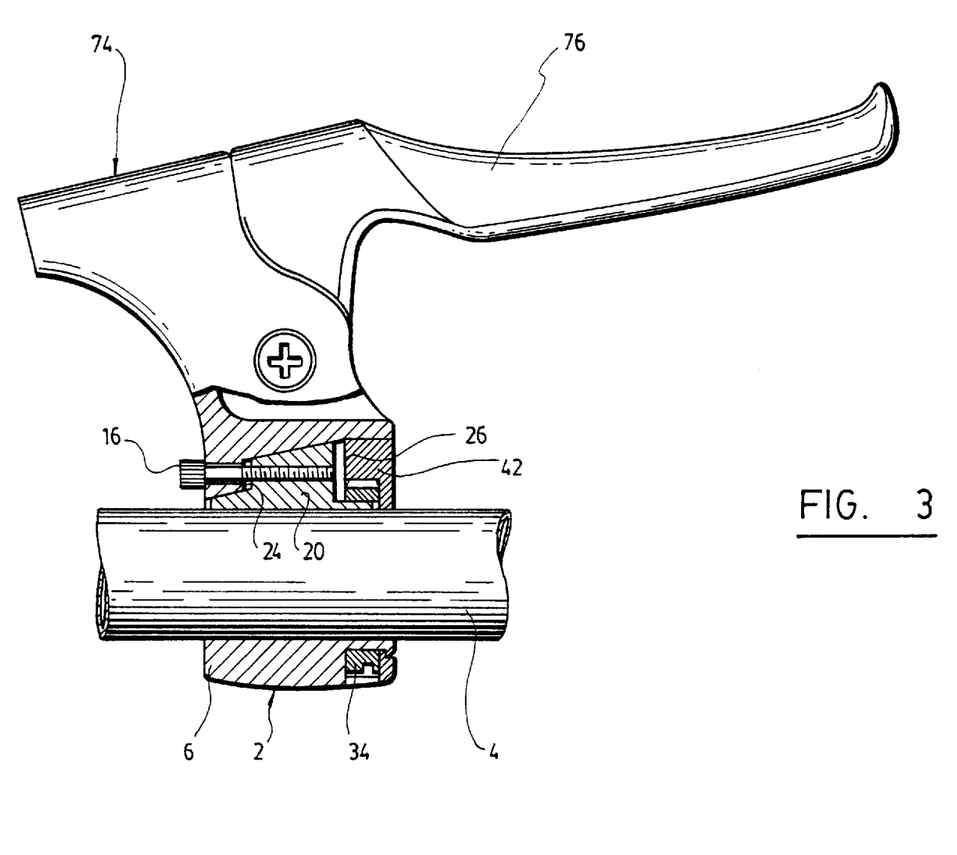
FIG. 3 is a top view with a partial cross section view of a combined speed shifter and brake handle assembly according to the invention, mounted on a bicycle handlebar.

The handlebar bracket 2 is used to secure the assembly on a bicycle handlebar 4 (as shown in FIG. 3).

Figure 5:
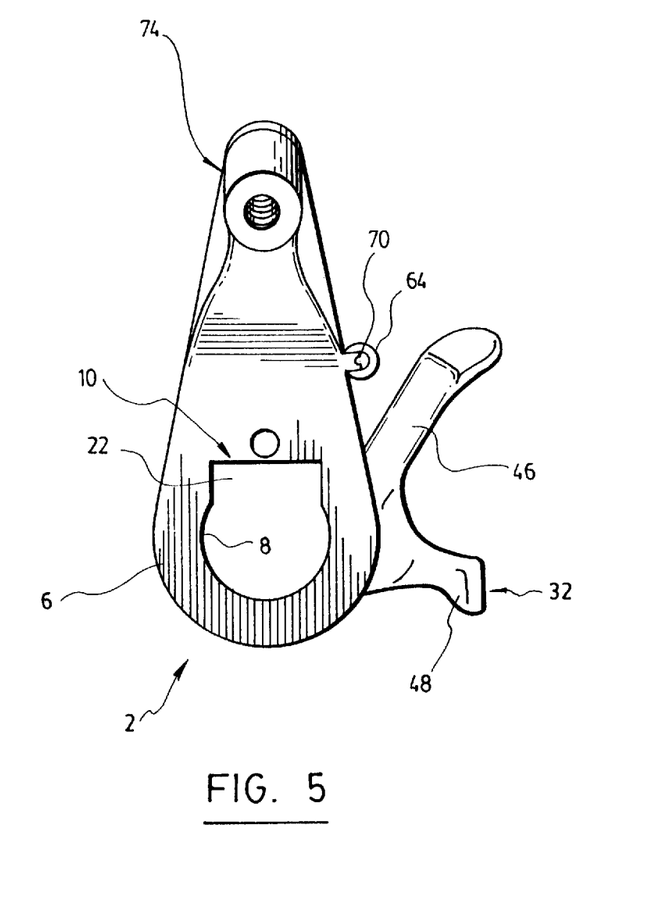
FIG. 5 is a side elevation view of a combined speed shifter and brake handle assembly according to the invention.

Referring to FIG. 5, the handlebar bracket 2 is conveniently in the form of a collar 6 having an inner cylindrical hole 8 to receive the bicycle handlebar 4, and a tightening device 10 for tightening the collar 6 around the bicycle handlebar 4.

Figure 2:
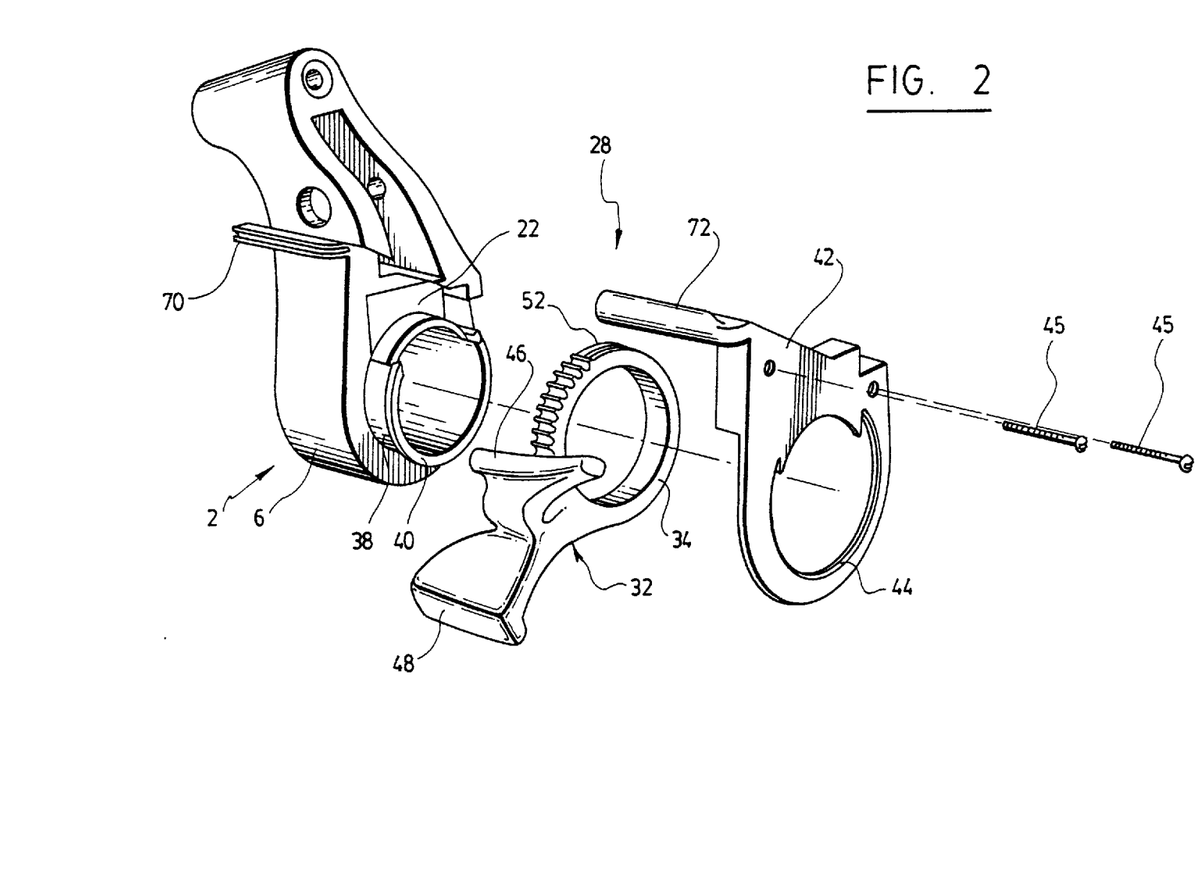
FIG. 2 is an exploded view of a combined speed shifter and brake handle assembly according to the invention.
Figure 4:
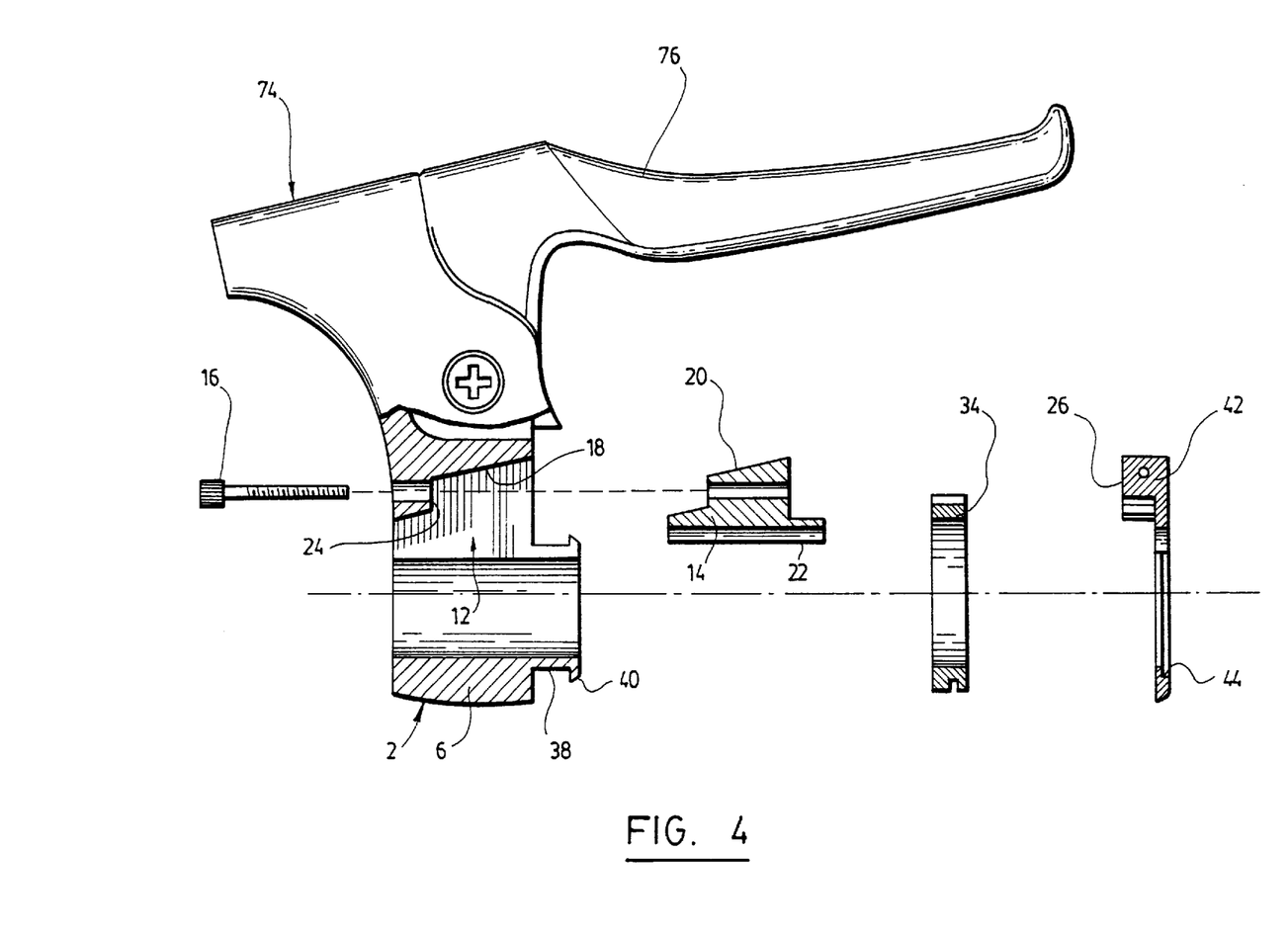
FIG. 4 is an exploded view of the assembly shown in FIG. 3, without the bicycle handlebar.

Referring to FIG. 4, the tightening device is made of a wedge member 14 slidably movable in a recess 12 by means of a screw 16. The recess 12 extends in a wall defining the cylindrical hole 8. The recess 12 has a sloped bottom surface 18. The wedge member 14 has a surface 20 sliding against the bottom surface 18 of the recess 12, and an opposite surface 22 shaped to complement the wall of the cylindrical hole 8 where the recess 12 extends, as best illustrated in FIGS. 2 and 5. The screw 16 is arranged to slidingly move the wedge member 20 in the recess 12 so that the opposite surface 22 thereof rises or lowers relative to the wall of the cylindrical hole 8, to tighten the collar 6 around the bicycle handlebar 4. The recess 12 can be provided with opposite stop surfaces 24, 26 (best shown in FIG. 3) to restrict the wedge member 14 to slide within a predetermined sliding zone.

It should be noted that other suitable tightening devices can be used as well. Furthermore, the handlebar bracket 2 is not limited to the form of a collar, as other types of brackets could be equally used, e.g. a bracket screwed to the handlebar 4.

Figure 6:
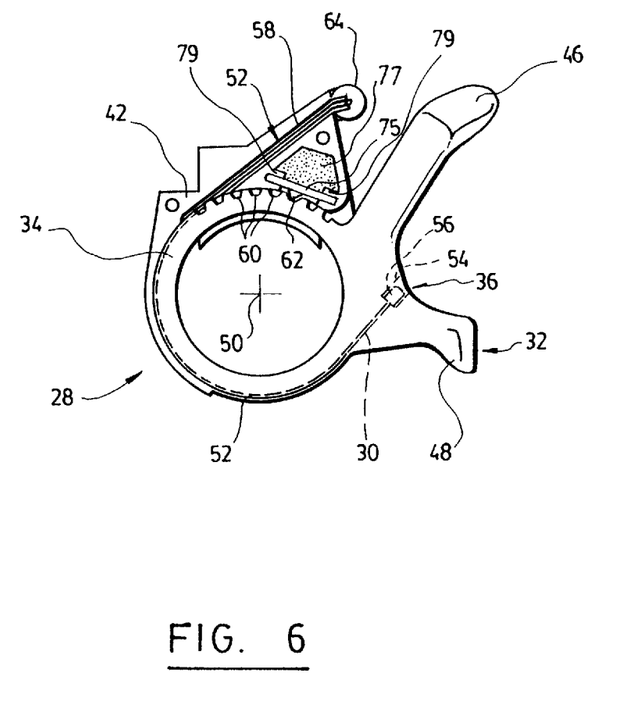
FIG. 6 is a cross section view of the shifter lever and the cap member of a combined speed shifter and brake handle assembly according to the invention.

Referring to FIGS. 2 and 6, the speed shifter mechanism 28 operates rotatably to pull or release a speed control cable 30 as required in most types of bicycle gearing devices. The speed shifter mechanism 28 includes a shifter lever 32 having an end provided with an annular member 34 sized to receive the bicycle handlebar 4, and a cable fastener 36 for retaining an end of the speed control cable 30. As it can be easily observed from FIG. 6, a clockwise rotation of the annular member 34 forced by the shifter lever 32 will produce a loosening of the speed control cable 30, whereas a counterclockwise rotation will produce a pulling of the speed control cable 30 around the bicycle handlebar 4.

Referring to FIG. 2, the annular member 34 of the shifter lever 32 is rotatably mounted for rotation about the bicycle handlebar 4. To this effect, there is provided a rim member 38 projecting on one side of the handlebar bracket 2, to rotatably receive the annular member 34 of the shifter lever 32. The rim member 38 is provided with a flange 40 opposite to the handlebar bracket 6. An annular cap member 42 is mounted onto the rim member 38, in abutment with the flange 40 to hold the annular member 34 of the shift lever 32 in place for rotation on the rim member 38. The annular cap member 42 is snappingly engageable onto the rim member 38 via the flange 40, and has an inner peripheral recess 44, for receiving the flange 40 in abutment. The annular cap member 42 can be further secured to the handlebar bracket 2 by means of screws 45.

Referring to FIG. 6, the shifter lever 32 comprises a first thumb pressable arm 46 outwardly projecting from the annular member 34 on one side of a rotation axis 50 of the annular member 34, and a second thumb pressable arm 48 outwardly projecting from the annular member 34 on an opposite side of the rotation axis 50 of the annular member 34. Therefore, a pressure exerted on the arm 46 will cause a counterclockwise rotation of the annular member 34, whereas a pressure exerted on the arm 48 will cause a clockwise rotation of the annular member 34, thereby performing up shifting or down shifting of the bicycle speeds.

The annular member 34 of the shifter lever 32 has a peripheral outer surface provided with a longitudinal groove 52 (best shown in FIG. 2) to receive the speed control cable 30 from a cable guide way 52 that slidably guides the speed control cable 30 around the bicycle handlebar 4 beside the shifter lever 32.

The cable guide way 52 is in the form of a channel 58 extending through the cap member 42. The channel 58 has an opening on an inner peripheral surface of the cap member 42, aligned with the groove 52 of the annular member 34 of the shifter lever 32, and an opposite opening on an outer surface of the cap member 42.

The cable fastener 36 comprises a housing 54 to receive and hold by abutment a lock head 56 at an end of the speed control cable 30. The housing 54 has a bored bottom surface communicating with the groove 52 of the annular member 34 of the shifter lever 32 for passage of the speed control cable 30. It should be understood that other suitable kinds of cable fastener 36 can also be used.

A predetermined frictional contact that opposes against rotation of the annular member 34 relative to the mounting elements 38, 40, 42 (as best shown in FIG. 2) is provided by means of a series of detent notches 60 extending along the peripheral outer surface of the annular member 34, and a spring tab 62 inwardly projecting from the inner peripheral surface of the annular cap member 52 to selectively engage the detent notches 60. The detent notches 60 can be positioned to index the spring tab 62 at turn positions of the annular member 34 corresponding to speed change stages. The spring tab 62 has a resilient thin band 75 held by opposite tracks 79 projecting from a space 77 within the annular member 34 to permit spring bending of the band 74 away from the detent notches 60. The space 77 can be filled with a resilient material to adjust spring property of the band 75 and indirectly the spring tab 62. It should be understood that the above manner to produce the frictional contact is not limitative and other suitable manners can be used to counter the biasing effect normally produced on the speed control cable by the gearing mechanism of the bicycle.

Referring to FIG. 1, a sleeve 64 extending across the handlebar bracket 2 is used to guide the speed control cable 30 toward the channel 58 (as shown in FIG. 6). The sleeve has an opening aligned with the opposite opening of the channel 58, and an opposite opening to receive the speed control cable 30.

The opposite opening of the sleeve 64 is provided with a mouth 66 to receive a sheathed end 68 of the speed control cable 30.

Referring to FIG. 2, the sleeve 64 can be formed of an elongated slit member 70 projecting from the handlebar bracket 2 on a surface thereof, and a semi-cylindrical jacket member 72 projecting perpendicularly from the outer surface of the cap member 42, to cover the slit member 70 when the cap member 42 is in place on the rim member 38.

The assembly is also provided with a brake bracket 74 projecting from the handlebar bracket 2, to pivotally receive an end of a brake lever 76 at a predetermined distance from the bicycle handlebar 4.

The handlebar bracket 2, the shifter mechanism 28 and the brake bracket 74 can be all in plastic material. Furthermore, the brake bracket 74 is preferably integrally molded with the handlebar bracket 2. In fact, as shown in FIG. 1, the assembly is generally in the form of a usual brake bracket 74 incorporating a rotative shifter lever mechanism 28.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A combined speed shifter and brake handle assembly for a multispeed bicycle, comprising:

a handlebar bracket to secure the assembly on a bicycle handlebar;

shifter means for pulling and releasing a speed control cable, the shifter means including:

a shifter lever having an end provided with an annular member sized to receive the bicycle handlebar and a cable fastening means for retaining an end of the speed control cable;

mounting means fixed to the handlebar bracket for rotatably mounting the annular member of the shifter lever for rotation about the bicycle handlebar, said mounting means including cable guide means for slidably guiding the speed control cable around the bicycle handlebar beside the shifter lever; and friction means cooperatively mounted on the annular member of the shifter lever and the mounting means, respectively, for providing a predetermined frictional contact that opposes against rotation of the annular member relative to the mounting means; and a brake bracket projecting from the handlebar bracket, to pivotally receive an end of a brake lever at a predetermined distance from the bicycle handlebars, wherein the handlebar bracket comprises a collar having an inner cylindrical hole to receive the bicycle handlebar, and a tightening means for tightening the collar around the bicycle handlebar, the tightening means comprising:

a recess extending in a wall defining the cylindrical hole, the recess having a sloped bottom surface;

a wedge member having a surface sliding against the bottom surface of the recess, and an opposite surface shaped to complement the wall of the cylindrical hole where the recess extends; and a screw to slidingly move the wedge member in the recess so that the opposite surface thereof rises or lowers relative to the wall of the cylindrical hole, to tighten the collar around the bicycle handlebar.

2. An assembly according to claim 1, wherein the handlebar bracket, the shifter means and the brake bracket are all in plastic material.

3. An assembly according to claim 2, wherein the brake bracket is integrally molded with the handlebar bracket.

4. An assembly according to claim 1, wherein the recess is provided with opposite stop surfaces to restrict the wedge member to slide within a predetermined sliding zone.

5. An assembly according to claim 4, wherein:
the mounting means comprise:
a rim member projecting on one side of the handlebar bracket, to rotatably receive the annular member of the shifter lever, the rim member being provided with a flange opposite to the handlebar bracket; and
an annular cap member mounted onto the rim member, in abutment with the flange to hold the annular member of the shift lever in place on the rim member;
the annular cap member is snappingly engageable onto the rim member via the flange, has an inner peripheral recess for receiving the flange in abutment, and is secured to the handlebar bracket by means of screws;
the shifter lever comprises a first thumb pressable arm outwardly projecting from the annular member on one side of a rotation axis of the annular member, and a second thumb pressable arm outwardly projecting from the annular member on an opposite side of the rotation axis of the annular member;
the annular member of the shifter lever has a peripheral outer surface provided with a longitudinal groove to receive the speed control cable from the cable guide means;
the cable fastening means comprises a housing to receive and hold by abutment a lock head at an end of the speed control cable, the housing having a bored bottom surface communicating with the groove of the annular member of the shifter lever for passage of the speed control cable;
the cable guide means comprises a channel through the cap member, the channel having an opening on an inner peripheral surface of the cap member, aligned with the groove of the annular member of the shifter lever, and an opposite opening on an outer surface of the cap member;
the friction means comprises a series of detent notches extending along the peripheral outer surface of the annular member, and a spring tab inwardly projecting from the inner peripheral surface of the annular cap member to selectively engage the detent notches;
a sleeve extends across the handlebar bracket to guide the speed control cable toward the channel, the sleeve having an opening aligned with said opposite opening of the channel, and an opposite opening to receive the speed control cable, the opposite opening of the sleeve being provided with a mouth to receive a sheathed end of the speed control cable, the sleeve comprising a elongated slit member projecting from the handlebar bracket on a surface thereof, and a semi-cylindrical jacket member projecting perpendicularly from the outer surface of the cap member, to cover the slit member when the cap is in place on the rim member;
the annular cap member comprises a resilient peripheral thin band having, on an inward side, the spring tab, and on an outward side, a space for spring bending of the band;

the handlebar bracket, the shifter means and the brake bracket are all in plastic material; and
the brake bracket is integrally molded with the handlebar bracket.

6. A combined speed shifter and brake handle assembly for a multispeed bicycle, comprising:
a handlebar bracket to secure the assembly on a bicycle handlebar;
shifter means for pulling and releasing a speed control cable, the shifter means including:
a shifter lever having an end provided with an annular member sized to receive the bicycle handlebar and a cable fastening means for retaining an end of the speed control cable;
mounting means fixed to the handlebar bracket for rotatably mounting the annular member of the shifter lever for rotation about the bicycle handlebar, said mounting means including cable guide means for slidably guiding the speed control cable around the bicycle handlebar beside the shifter lever; and
friction means cooperatively mounted on the annular member of the shifter lever and the mounting means, respectively, for providing a predetermined frictional contact that opposes against rotation of the annular member relative to the mounting means; and
a brake bracket projecting from the handlebar bracket, to pivotally receive an end of a brake lever at a predetermined distance from the bicycle handlebar,
wherein the mounting means comprise:
a rim member projecting on one side of the handlebar bracket, to rotatably receive the annular member of the shifter lever, the rim member being provided with a flange opposite to the handlebar bracket; and
an annular cap member mounted onto the rim member, in abutment with the flange to hold the annular member of the shift lever in place on the rim member.

7. An assembly according to claim 6, wherein the annular cap member is secured to the handlebar bracket by means of screws.

8. An assembly according to claim 6, wherein the shifter lever comprises a first thumb pressable arm outwardly projecting from the annular member on one side of a rotation axis of the annular member, and a second thumb pressable arm outwardly projecting from the annular member on an opposite side of the rotation axis of the annular member.

9. An assembly according to claim 6, wherein:
the annular member of the shifter lever has a peripheral outer surface provided with a longitudinal groove to receive the speed control cable from the cable guide means; and
the cable fastening means comprises a housing to receive and hold by abutment a lock head at an end of the speed control cable, the housing having a bored bottom surface communicating with the groove of the annular member of the shifter lever for passage of the speed control cable.

10. An assembly according to claim 9, wherein the cable guide means comprises a channel through the cap member, the channel having an opening on an inner peripheral surface of the cap member, aligned with the groove of the annular member of the shifter lever, and an opposite opening on an outer surface of the cap member.

11. An assembly according to claim 10, wherein the friction means comprises a series of detent notches extending along the peripheral outer surface of the annular member, and a spring tab inwardly projecting from the inner peripheral surface of the annular cap member to selectively engage the detent notches.

12. An assembly according to claim 10, further comprising a sleeve extending across the handlebar bracket to guide the speed control cable toward the channel, the sleeve having an opening aligned with said opposite opening of the channel, and an opposite opening to receive the speed control cable.

13. An assembly according to claim 12, wherein the opposite opening of the sleeve is provided with a mouth to receive a sheathed end of the speed control cable.

14. An assembly according to claim 12, wherein the sleeve comprises an elongated slit member projecting from the handlebar bracket on a surface thereof, and a semi-cylindrical jacket member projecting perpendicularly from the outer surface of the cap member, to cover the slit member when the cap member is in place on the rim member.

15. An assembly according to claim 6, wherein the friction means comprises a series of detent notches on an outer peripheral surface of the annular member, and a spring tab inwardly projecting from an inner peripheral surface of the annular cap member to selectively engage the detent notches.

16. An assembly according to claim 15, wherein the detent notches are positioned to index the spring tab at turn positions of the annular member corresponding to speed change stages.

17. An assembly according to claim 15, wherein the annular cap member comprises a resilient peripheral thin band having, on an inward side, the spring tab, and on an outward side, a space for spring bending of the band.

18. An assembly according to claim 6, wherein the annular cap member is snappingly engageable onto the rim member via the flange, and has an inner peripheral recess for receiving the flange in abutment.

\* \* \* \* \*